United States Patent Office 3,002,033
Patented Sept. 26, 1961

3,002,033
PREPARATION OF 300 TO 500 MOLECULAR WEIGHT ALKYL CHLORIDES
George C. Feighner, Ponca City, Okla., assignor to Continental Oil Company, Ponca City, Okla., a corporation of Delaware
No Drawing. Filed Feb. 9, 1959, Ser. No. 791,801
4 Claims. (Cl. 260—658)

This invention relates to the preparation of alkyl chlorides having a molecular weight in the range of 300 to 500 and is more particularly concerned with an efficient and economical method for the preparation of such alkyl chlorides by the controlled condensation of propene and tertiary butyl chloride or nonyl chloride in the presence $AlCl_3$ or $FeCl_3$ as catalysts.

It has been discovered that alkyl chlorides of a molecular weight in the range of 300 to 500 may be used to alkylate benzene; the alkylated benzene may be subsequently sulfonated to produce oil soluble sulfonates suitable to supplyment sulfonated polydodecylbenzenes. Polydodecylbenzenes is one of the known and widely used alkylated benzene intermediates, and this alkylate is in short supply upon occasion. A method of supplementing the limited supply of polydodecylbenzene is highly desirable. Of course, the alkyl chlorides hereby produced in the invention may serve other useful ends as well.

It was found in practice that the prior art processes of preparing alkyl halide by condensation, failed to produce alkyl halides of the desired molecular weight. From my own experience as well as work performed by others, it was observed that these previously known methods produced either comparatively low molecular weight or comparatively high molecular weight alkyl halides. Thus alkyl halides produced by these methods are unsuitable substitutes for the alkyl chloride intermediates produced in accordance with the present disclosure at least in preparing eventually the sulfonates utilizable as contemplated hereinabove.

The principal object of this invention is the efficient and economical preparation of a new mixture of alkyl chlorides having a molecular weight in the range of 300 to 500 which are not normally obtainable by following prior art procedures and teachings. It is another object of this invention to provide high molecular weight alkyl chlorides which are suitable, after subsequent processing, such as alkylation of aromatics therewith and sulfonation of the resulting alkylate and finally forming an alkaline earth metal sulfonate, as valuable oil-soluble peptizers for inorganic oxide additives in lubricating oils. Still another object of the invention is the utilization of raw materials in somewhat of an over-abundant supply as a by-product around petroleum refineries and which are of limited value due to their otherwise limited usefulness.

These and other objects are accomplished by the present invention, the understanding of which will be facilitated; and the incorporation of same into physical embodiments will be materially aided by the hereinafter ensuing more detailed discussion.

Briefly, my invention may be described as a process for preparing alkyl halides having a molecular weight varying from 300 to 500 which comprises reacting 3 to 5 moles of propene per mole of alkyl chloride, said alkyl chloride being selected from the group consisting of tertiary butyl chloride and a highly branched nonyl chloride and being further characterized in that said reaction is conducted at a temperature of 50 to −70° C. in the presence of an aluminum or ferric chloride catalyst. As to the amount of catalyst used, that is dependent upon the specific metal chloride used. When aluminum chloride is used, the amount should be .75 mole percent and, when ferric chloride is used, the amount should be at least 2.5 mole percent, based on propene.

There are critical minimal amounts of these two operable catalysts. The minimal amounts have already been specified for the $AlCl_3$ and the $FeCl_3$. The reasons for these minimal limits of .75 and 2.5 mole percent for $AlCl_3$ and $FeCl_3$, respectively, are that when lesser amounts were employed, the molecular weight of the product was too low, or there was no discernible reaction. The upper limits of catalyst quantity is based chiefly on economic considerations. There are actually two factors which affect the economics and thereby determine the upper limit of catalyst. These are the initial cost of the catalyst and the fact that the catalyst complexes with the product and therefore too much excess of catalyst is undesirable. Usually the quantity of $AlCl_3$ does not exceed 1.5 mole percent, and the quantity of $FeCl_3$ does not exceed 5.0 mole percent.

The process and the results obtained are rather unexpected in view of the teachings of prior art. Prior art teachings propose processes which, broadly, appear similar to the instant invention; however these distinguish most significantly on unpredictable specifics, the results being that the discovery of the present unique invention is inhibited by the generalized extensions in these teachings. Thus, the procedures found and herein disclosed are not to be confused with these prior disclosures, lest one would be led away from the proper operations and ultimate goal which flows from the present distinctively different discovery.

In order that the present invention be better understood, these other processes will be briefly discussed.

First, the known processes might be best grouped into three main classes for the present discussion. These are telomerization, condensations, and polymerizations.

Telomerization is a reaction which produces higher molecular weight halogen-containing compounds from an olefin and usually a halogenated hydrocarbon by the joining of molecules of each. The reaction is usually conducted at elevated temperatures and pressures and always in the presence of an organic activator such as a peroxygen compound. The product is usually a polyhalogenated hydrocarbon being formed through a mechanism involving free radicals. Further discussion of telomerization is unnecessary to distinguish it from this invention; those versed in the art will find the above sufficient.

Polymerization is the formation of high molecular weight hydrocarbons from a single olefin or more than one olefin or even a diolefin in the presence of catalyst, one type of catalyst being the well-known Friedel-Crafts catalyst, but others such as some organic compositions are often equally as suitable. Polymerization as used herein involves the combining of hydrocarbon molecules only. Because of the higher degree of analogy between the reaction termed condensation and my invention (which nevertheless is unpredictably different), the polymerization reaction will not be given additional consideration, since it will not serve any useful purpose.

Condensation reactions involve the combining of halogenated hydrocarbon molecules and olefin molecules and occasionally several olefin molecules with one halogenated hydrocarbon molecule.

It will be agreed that condensation as contemplated here should be separated into subgroups for individual consideration due to wide differences in the raw materials and their reactivities, the processes, and the products. Briefly, these subgroups are reactions involving (a) an unsaturated halo-hydrocarbon with a mono-olefin, (b) an unsaturated halo-hydrocarbon with a diolefin, (c) a saturated halo-hydrocarbon with a mono-olefin, and (d) a saturated halo-hydrocarbon with a diolefin. Condensations of a saturated halo-hydrocarbon and a mono-olefin (subgroup c) is the type of the present discovery. The others will receive no further discussion for like reasons relative to analogy as that of polymerization. The accepted catalyst is usually the Friedel-Crafts catalysts, any of which are suitable according to prior art teachings, some merely being preferred over the others. The temperature at which the reaction proceeds varies some in these prior art procedures; however, in general, these are all in a common broad range. Invariably, in my experience and the published experiences of these workers, their processes result in a product which is essentially either a low molecular weight alkyl halide or an alkyl halide having a comparatively high molecular weight.

More specifically, the products heretofore have been alkyl halides having a molecular weight usually below 200 or above at least 1,000. Compounds of the prior art type having a molecular weight of less than 200 usually evolve as the result of the chemical combination of one halohydrocarbon molecule with one hydrocarbon molecule and on occasion by the joining of a very limited plurality of small hydrocarbon molecules with one halo-hydrocarbon. Of course, it follows that compounds of the prior art type having a molecular weight of at least 1,000 are formed eventually by the joining of a large plurality of hydrocarbon molecules with a halo-hydrocarbon. In short, no known method of condensation will make polymers in this range.

It is not clearly understood why the present invention works to produce the desired alkyl halides; however certain differences have been noted in the present method over prior art methods. It appears that no one factor is responsible for the difference achieved but that the process as a whole is necessary. Each factor is critical to the desired end, and these must be considered together and not as independent variables.

Prior art teaches essentially that any Friedel-Crafts catalyst is suitable; however the temperature is higher for the less active catalysts. I have found, in the present process at least that only $AlCl_3$ or $FeCl_3$ is suitable and only then when used in the proper proportions. When other catalysts were employed, there was little if any reaction; or the products were of an entirely different type. This was especially true at the higher temperatures suggested for other catalysts taught by the prior art.

Additionally, the prior art suggests, and many demonstrate, the use of an activator such as the hydrogen halides. I have found the use of activators suggested, for example, hydrogen chloride, are disadvantageous. The best that can be said for them in the present process is that they reduce the quantity of alkyl chloride having a molecular weight of 300 to 500. It has been my experience that, as a general rule, the use of hydrogen chloride caused a product having a much lower molecular weight to be formed, namely, isopropyl chloride, regardless of other factors.

Of the alkyl halides suggested by prior art and tested by me, only tertiary butyl chloride, with propene, will yield the desired product and then only when the other factors of my process are astutely adhered to. Isopropyl chloride with propene to name one resulted in a product having a molecular weight of approximately 1,000 and even higher.

Besides tertiary butyl chloride, nonyl chloride with propene was found to yield a higher alkyl chloride with the proper molecular weight. The nonyl chloride herein is actually a mixture of nonyl chlorides having different isomeric structures. It is best identified by its manner of preparation. It is a mixture of branch-chained trimers of propene obtained as a by-product stream from recycled nine-carbon polymerization products obtained by passing propene over a supported phosphoric acid catalyst. That is, the nine-carbon atom products resulting from polymerization of propene are recycled. Some of these are combined with more propene during the recycle pass and are converted to compounds containing more than nine carbon atoms, such as dodecenes. Some, however, pass through apparently unchanged. It is thought that these are highly branched nonenes. The nonenes which pass through unchanged in the recycle stage provide the nonyl chloride of the present invention when they are hydrochlorinated. The nonyl chloride thus prepared is not only suitable in the present invention but is even unexpectedly and markedly superior to tertiary butyl chloride, and the two chlorides are therefore not necessarily equivalent. The reasons for this superiority are not presently known. It is to be noted that the nonene fraction prepared as above usually contain some similarly highly branched $C_6$—$C_8$ and $C_{10}$ olefins mixed therein. This has not been found to be particularly disadvantageous. A typical boiling range of such a nonene fraction is as follows:

A.S.T.M. D–86–Engler:
| | |
|---|---|
| I.B.P. | 128° F. |
| 5% | 232° F. |
| 10 | 246° F. |
| 50 | 274° F. |
| 90 | 295° F. |
| 95 | 305° F. |
| F.B.P. | 319° F. |

The mole ratio of reactants taught by prior art ranges from 1 to as high as 500 moles of starting alkyl halide to 1 mole of olefin. On the other hand, I find it necessary to use an excess of my olefin, propene. In fact, a mole ratio of at least 3 and preferably 3 to 5 moles of propene per mole of starting alkyl halide has been found essential and critical for success relative to obtaining the molecular weight of the product sought here. At ratios below 3 propenes to one of the chloride, products of decreasing molecular weights appear in increasing quantities. Both higher and lower molecular weight but no intermediate molecular weight products are produced by prior art when using an excess of alkyl halide; yet here an intermediate molecular weight product was obtained when using an excess of propene, a reversal of the excess component.

The temperature is within the range taught by prior art; however the upper portion of the range is definitely unsuitable as has already been pointed out. More specifically, we have found the temperature range of about 50° C. to 100° C. unsuitable regardless of the particular catalyst employed. In some cases at these temperatures, no utilizable product is obtained suitable for any known purpose. The broad operable range here is —70 to approximately 50° C. To be more specific, the operable range with $FeCl_3$ is —20 to 50° C. In the case of $AlCl_3$, the operable range is —70 to 25° C. Preferably, a temperature of 0 to 30° C. is employed with $FeCl_3$ and preferably —30 to 0° C. is employed with $AlCl_3$.

It must be considered that the olefin utilized in the invention, viz., propene, is critical, as other olefins suggested in the art have been found to yield different results.

Of course, a solvent for the catalyst may be employed in either a batch operation or continuous process. A convenient solvent if one is to be used is the starting alkyl halide.

Time of reaction has not been found critical in our experience. At least we found no difference in results due to time when varied from a fraction of a second in a continuous process to over an hour in batch operations.

The examples given below are by way of illustration only. Despite the fact that the elements of the invention are quite critical, it is, of course, to be understood that the process admits of some variations over that specifically shown in the illustrative examples.

PREPARATION OF NONYL CHLORIDE

A nonene fraction prepared as defined above and containing some highly branched $C_6$—$C_8$ and $C_{10}$ olefins was reacted with HCl at −60° to −70° C. for 3 hours in the presence of FeCl₃ as catalyst. The catalyst was quenched with 50 percent aqueous methanol and the solution warmed to room temperature. The solution then was washed with a water and NaHCO₃ solution, dried, and filtered to recover the nonyl chloride.

*Example I*

The reaction was run in one-liter flask fitted with a stirrer, cooling bath, thermometer, reflux condenser, and inlets for propene and nonyl chloride. The flask was cooled and maintained at −10° to −30° C. throughout the reaction. 5 grams of AlCl₃ catalyst was charged to the flask. Propene and highly branched nonyl chloride, both cooled to approximately −20° C., were metered to the flask in a mole ratio of 5 propene to 1 nonyl chloride. A total of 109 grams of propene and 100 grams of nonyl chloride was added slowly. The reaction time, inclusive of that required for adding the reactants, was approximately one hour. At the end of the run, the product was added to water and then washed with a water and sodium bicarbonate solution, dried with sodium sulfate, and filtered. The filtrate was distilled in a one-plate column into an overhead cut and bottoms cut, the overhead comprising that taken over up to 120° C. at 20 mm. The bottoms analyzed as 96 mole percent alkyl chlorides, having an average molecular weight of 405, 4 mole percent of an olefin, and no saturates.

*Example II*

Replacing the AlCl₃ with 25 grams of FeCl₃ in the reaction of Example I yielded an alkyl chloride having a molecular weight of 329.

Similar results to Examples I and II have been obtained using tertiary butyl chloride for the nonyl chloride.

Yields have been good, ranging as high as 77 percent despite handling losses. The yields without handling losses as occurred here often exceed 90 percent. Products of the reaction which are utilizable for alkylation range still higher, as some high molecular weight olefins are also produced suitable for alkylation and yield an alkylate on the order produced by that of the 300 to 500 molecular weight alkyl chlorides.

It is obvious that many variations may be made in the products and processes of this invention without departing from the spirit and scope thereof as defined in the appended claims.

What is claimed is:

1. A process of preparing alkyl halides having a molecular weight varying from 300 to 500 which comprises reacting 3 to 5 moles of propene per mole of an alkyl chloride, said alkyl chloride being selected from the group consisting of tertiary butyl chloride and highly branched nonyl chloride and being further characterized in that said reaction is conducted at a temperature of 50 to −70° C. in the presence of a catalyst selected from the group consisting of aluminum chloride and ferric chloride, the process being still further characterized in that when the catalyst selected is aluminum chloride at least .75 mole percent based on propene is employed, and when the catalyst selected is ferric chloride at least 2.5 mole percent based on propene is employed.

2. A process of preparing alkyl halides having a molecular weight varying from 300 to 500 which comprises reacting 3 to 5 moles of propene per mole of an alkyl chloride, said alkyl chloride being selected from the group consisting of tertiary butyl chloride and highly branched nonyl chloride and being further characterized in that said reaction is conducted at a temperature of 50 to −70° C. in the presence of .75–1.5 mole percent AlCl₃ as catalyst, based on weight of propene, is employed.

3. A process of preparing alkyl halides having a molecular weight varying from 300 to 500 which comprises reacting propene with highly branched nonyl chloride in a mole ratio of 3 to 5 moles of propene per mole of nonyl chloride in the presence of .75–1.5 mole percent AlCl₃ based on propene and at a temperature which varies in the range of −30 to 0° C.

4. A process of preparing alkyl halides having a molecular weight varying from 300 to 500 which comprises reacting propene with highly branched nonyl chloride in a mole ratio of 3 to 5 moles of propene per mole of nonyl chloride in the presence of 2.5–5 mole percent FeCl₃ based on propene and at a temperature which varies in the range of 0° to 30° C.

References Cited in the file of this patent

UNITED STATES PATENTS

| | | |
|---|---|---|
| 2,419,500 | Peterson et al. | Apr. 22, 1947 |
| 2,533,053 | Schmerling | Dec. 5, 1950 |